No. 830,191. PATENTED SEPT. 4, 1906.
C. T. WAGGONER.
REIN GUARD.
APPLICATION FILED OCT. 2, 1905.
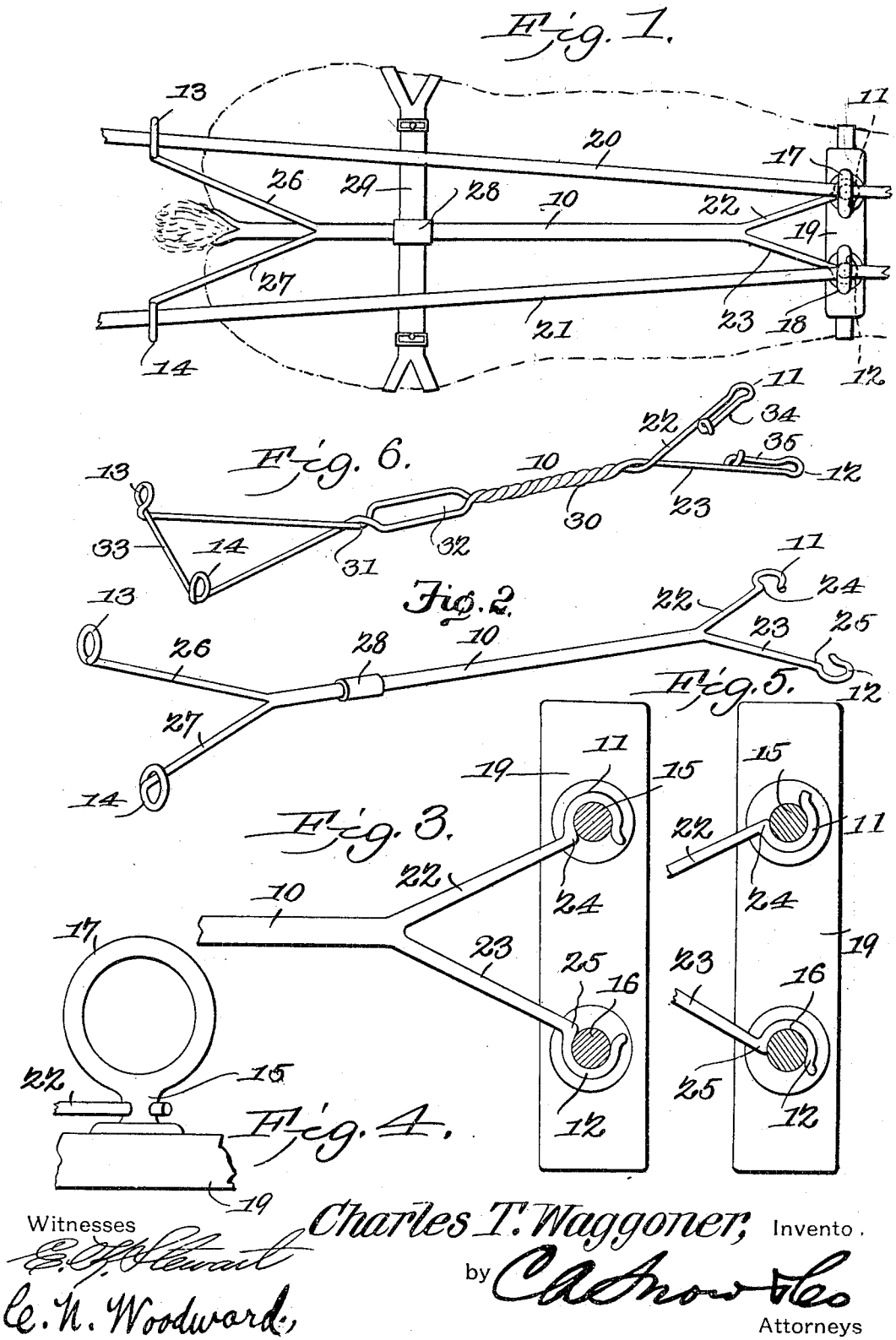
Witnesses
Charles T. Waggoner, Inventor.
by
Attorneys

UNITED STATES PATENT OFFICE.

CHARLES T. WAGGONER, OF SPARTANSBURG, PENNSYLVANIA.

REIN-GUARD.

No. 830,191.　　　Specification of Letters Patent.　　　Patented Sept. 4, 1906.

Application filed October 2, 1905. Serial No. 281,064.

*To all whom it may concern:*

Be it known that I, CHARLES T. WAGGONER, a citizen of the United States, residing at Spartansburg, in the county of Crawford and State of Pennsylvania, have invented a new and useful Rein-Guard, of which the following is a specification.

This invention relates to improvements in attachments to harness for supporting the driving-reins to prevent them from becoming entangled in the horse's tail or projecting portions of the harness, and has for its object to simplify and improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportions, and minor details of construction may be resorted to without departing from the principle or sacrificing any of the advantages of this invention within the scope of the appended claims.

In the drawings, Figure 1 is a plan view of the improved device applied. Fig. 2 is a perspective view, enlarged, of the improved device. Fig. 3 is an enlarged sectional detail of the inner or saddle-pad end of the device. Fig. 4 is a view of a rein-terret illustrating the manner of coupling the device thereto. Fig. 5 is a view similar to Fig. 3, illustrating a modification in the construction. Fig. 6 is a view similar to Fig. 2, illustrating another modified form of the construction.

The improved device comprises a bar 10, of resilient wire, of sufficient strength to withstand the strains to which it will be subjected, and with spaced reversely-disposed open hooks 11 12 at one end and spaced eyes 13 14 at the other end, the hooks for yieldably engaging the shanks 15 16 of the rein-terret 17 18 upon the saddle portion 19 of the harness, and the eyes for receiving the driving-reins (indicated at 20 21) after passing through the terret, as represented in Fig. 1.

The hooks 11 12 are preferably formed at the ends of forked members 22 23, so that they can be readily sprung apart and coupled to the terrets, and the hooks will also be formed with shoulders 24 25, as shown more clearly in Fig. 3, so that they cannot be detached by any lateral movement applied to the rein or rein-bearing end of the bar. The eyes 13 14 are also preferably disposed at the ends of forked portions 26 27.

A saddle or guard 28 is attached to the bar 10 at the point where it passes over the hip-strap 29 to bear upon the same and hold the bar spaced therefrom to prevent undue friction between the bar and the harness members while in use.

The bar 10 being held normally in position centrally of the back of the horse the reins 20 21 will also be held in central position and at a sufficient distance from the tail of the draft-animal to prevent entanglement with the reins or entanglement of the reins with protruding parts of the harness. The resiliency of the bar 10 permits a certain degree of lateral movement to the device without danger of such movement uncoupling the hooks 11 12, while at the same time the device can be easily detached when required by distending one or both of the forked members 22 23. By this arrangement it will be obvious that the portions of the reins rearwardly of the eyes 13 14 may be moved to either side, as by the driver standing on the ground, and at the same time retain a straight rearward pull upon the reins when it is desired to drive from that position, which may be required for a limited time at intervals more or less frequent.

The device is simple in construction, can be inexpensively manufactured, and of any suitable material, and plated or otherwise ornamented or protected.

The device will not detract from the appearance of the harness, as it is not conspicuous and is located at a part of the harness where its presence will not be observed.

The hooks 11 12 may be reversed in position, as shown in Fig. 5, or the whole device may be formed from one single piece of wire entwisted, as at 30 31, with an intermediate loop 32 for bearing upon the back-strap and hip-straps in the same manner and for the same purpose as the band 28 in the structure shown in Figs. 1 and 2.

In the modified structure shown in Fig. 6 also the eyes 13 14 are connected by a bar 33, and the hooks 11 12 are extended rearwardly, as shown at 34 35; but it will be obvious that these slight changes do not effect a departure from the principle of the invention, as the same results are produced and in substantially the same manner.

Having thus described the invention, what is claimed is—

1. As a new article, a rein-guard comprising a bar having divergent resilient arms at one end terminating in hooks opening in opposite directions and transversely of the bar for yieldably engaging the shanks of the rein-terrets and with spaced eyes at the other end of the bar for receiving the driving-reins.

2. As a new article, a rein-guard comprising a bar having diverging resilient arms at one end terminating in hooks opening in opposite directions transversely of the bar and adapted to detachably engage the shanks of the rein-terrets, said diverging arms extending at one side of the center of said shanks, whereby shoulders are produced to prevent displacement of the hooks by the lateral movement of the rein-bearing end of the bar.

3. As a new article, a rein-guard comprising a bar having spaced reversely-disposed hooks at one end for yieldably engaging the shanks of the rein-terrets and with spaced eyes at the other end for receiving the driving-reins, and a guard intermediate the bar for bearing upon the hip-straps and maintaining the bar movably in position thereon.

In testimony that I claim the foregoing as my own I have hereto affixed my signature in the presence of two witnesses.

CHARLES T. WAGGONER.

Witnesses:
 ROBT. J. OSBORNE,
 L. L. HARTWELL.